Figure 1:
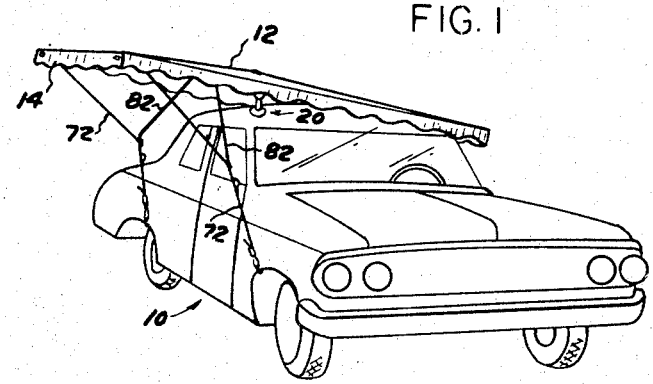

Oct. 31, 1967  C. G. ROBERTS  3,349,784
SHELTER ATTACHMENT FOR AUTOMOBILES
Filed Oct. 22, 1965  2 Sheets-Sheet 1

INVENTOR
CHARLES G. ROBERTS

BY
ATTORNEYS

Oct. 31, 1967     C. G. ROBERTS     3,349,784
SHELTER ATTACHMENT FOR AUTOMOBILES
Filed Oct. 22, 1965     2 Sheets-Sheet 2
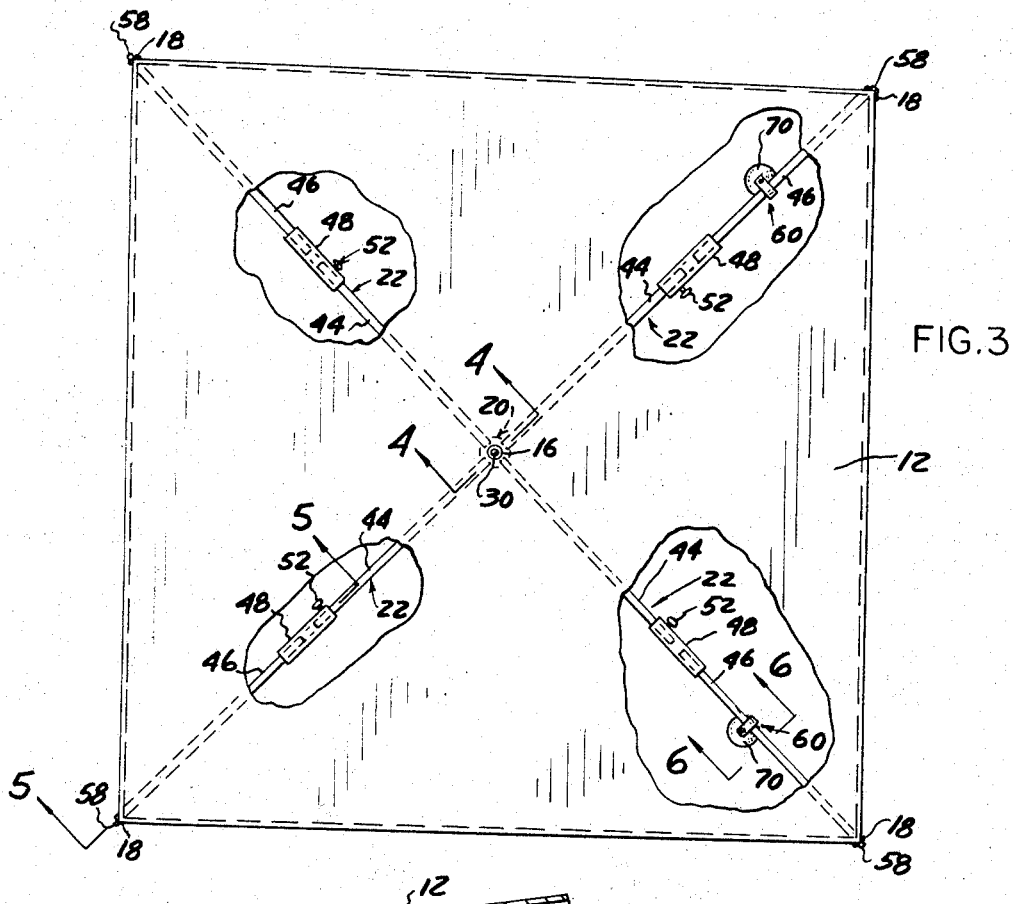
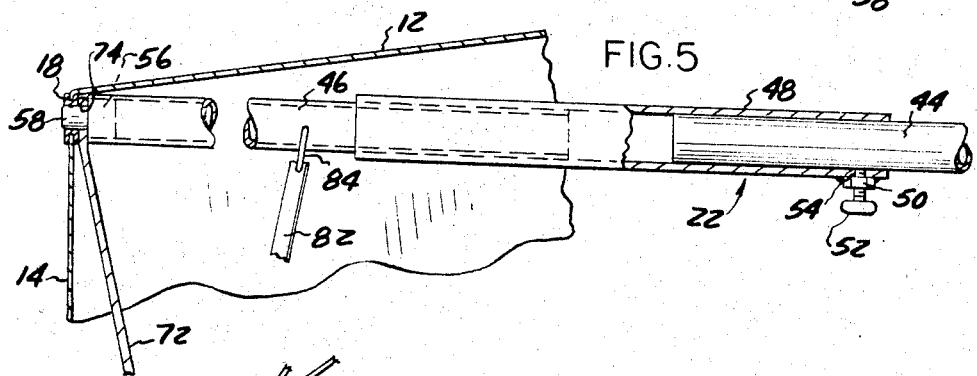
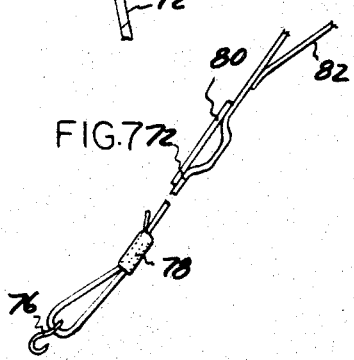
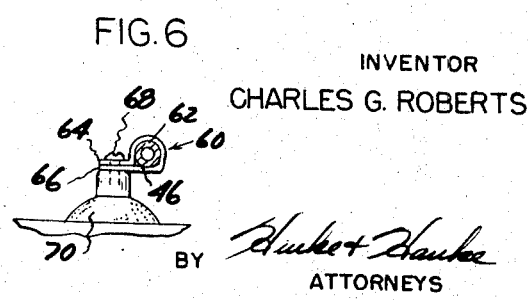
INVENTOR
CHARLES G. ROBERTS
BY    ATTORNEYS United States Patent Office 3,349,784
Patented Oct. 31, 1967

3,349,784
SHELTER ATTACHMENT FOR AUTOMOBILES
Charles G. Roberts, 23861 Verne, Detroit, Mich. 48219
Filed Oct. 22, 1965, Ser. No. 502,076
1 Claim. (Cl. 135—5)

The present invention relates to shelters and more particularly to a shelter attachment for automobiles.

Motorists frequently find it advantageous to erect either over or at the side of their automobiles a protective awning or other covering for the purpose of obtaining protection from the elements. Heretofore a common method for supporting the frame of such a shelter has been to attach the supporting arms to the door handles. This has required, depending on the particular device, that the doors be in either a closed position preventing access to the interior of the automobile or an open position in which case the interior of the automobile is exposed to the elements. Another method of erecting such shelters has been to utilize a ground-engaging supporting and securing device which is used in conjunction with a tensioning device to draw the awning or covering tightly against the top of the automobile. This method when employed on the modern automobile with its low body height results in a shelter with a severely restricted overhead clearance. Ground engaging supports also prevent the automobile from being moved without dismantling the shelter.

The present invention provides a collapsible shelter for attachment to an automobile or the like and in which the automobile provides the sole support for the shelter. As will become more apparent as the description proceeds means are provided for positioning the covering above the roof of the automobile so that even with the low automobiles presently manufactured there is ample head room. Further by utilizing the automobile as the support and eliminating ground engaging support means the automobile can be moved with the shelter in place. This permits the automobile to be moved periodically if desired to position the shelter to produce the maximum possible shade as the sun positions changes or to afford the maximum possible protection in the event of rain or wind change. Further, by positioning the covering above the roof an air space is provided between the roof of the automobile and the covering and this tends to maintain the interior of the automobile cool. The supporting means of the present invention produces no interference with the doors of the automobile so that they can be opened and closed on either side with the shelter in place. The support means can be readily dismantled and collapsed for storage in the automobile or elsewhere when not in use.

It is an object then of the present invention to provide a means of supporting a shelter attachment for automobiles that will provide an air cooled space over the automobile and also provide a sheltered area outside the vehicle by providing a framing device that is attached to the top of the vehicle and that supports a covering above the vehicle and projecting beyond one side of the vehicle.

It is another object of the present invention to provide a shelter attachment that can be rolled into a compact bundle for storage by providing a readily dismantled and collapsible supporting means for such shelter attachments.

It is still another object of the present invention to provide a shelter that can be easily and qiuckly erected or dismantled by providing a frame structure for such a shelter utilizing a minimum of readily connected and disconnected elements.

Figure 2:
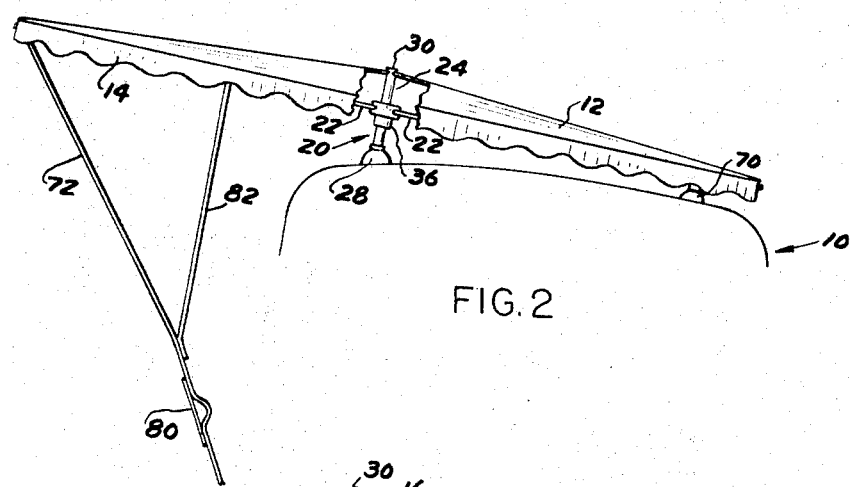
Figure 4:
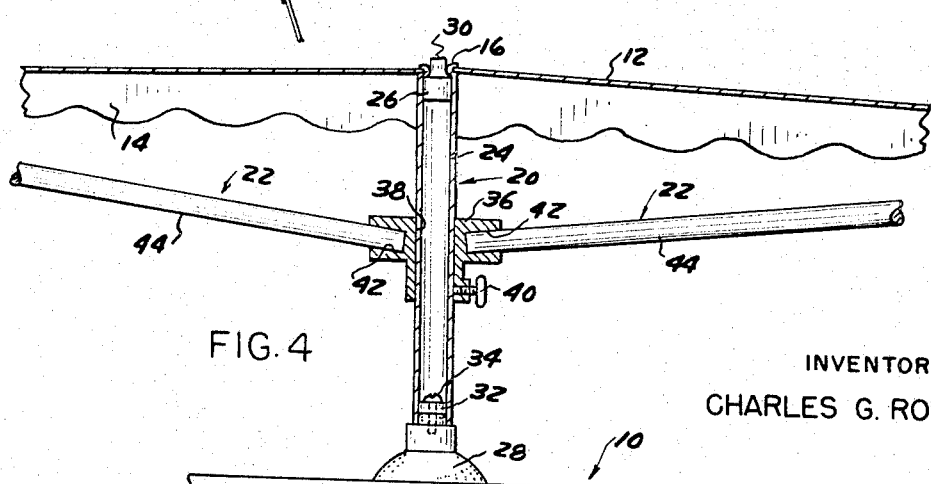

Still further objects and advantages will readily occur to one skilled in the art to which the invention pertains upon reference to the following drawings in which like reference characters refer to like parts throughout the several views and in which, FIG. 1 is a perspective view of an automobile equipped with the shelter attachment of the present invention, FIG. 2 is an enlarged end view of the assembly shown in FIG. 1 with a portion removed for purposes of clarity, FIG. 3 is a fragmentary plan view of the shelter illustrated in FIG. 1 with a portion of the covering cut away for purposes of clarity, FIG. 4 is a cross-sectional view of the center post assembly of the present invention as seen substantially from line 4—4 of FIG. 3, FIG. 5 is a fragmentary cross-sectional view as seen substantially from line 5—5 of FIG. 3, FIG. 6 is a fragmentary cross-sectional view as seen substantially from line 6—6 of FIG. 3, and FIG. 7 is a fragmentary elevational view of the tie down assembly of the present invention.

Description

Now referring to the drawings for a more detailed description of the present invention, a preferred shelter is illustrated in FIGS. 1 and 2 as being mounted to an automobile 10. The shelter preferably comprises a fabric top member 12, which may be formed from a suitable lightweight flexible material such as canvas. Generally, the top member 12 is of rectangular formation possessing suitable dimensions for the uses and purposes set forth and is preferably provided with a peripheral flap 14 which can if desired be scalloped for appearance as shown.

As can best be seen in FIGS. 3 and 4 a grommet 16 is mounted in a substantially central position in the top member 12 to provide a reinforced opening therethrough and as can best be seen in FIGS. 3 and 5 similar grommets 18 are provided in the flap 14, one at each corner of the top member 12.

The supporting means for the top member 12 preferably comprises a center post assembly 20 as can best be seen in FIGS. 2 and 4 and diagonally extending arms 22 as can best be seen in FIGS. 3-6. The center post assembly 20 preferably comprises a tubular member 24 which carries at one end an end plug 26 and at the opposite end a suction cup 28. The end plug 26 is dimensioned to fit within the end of the tubular member 24 and is secured in place by any convenient means such as by staking with a reduced end portion 30 disposed exteriorly of the tubular member 24. A circular plug 32 is mounted within the opposite end of the tubular member 24 by any convenient means such as staking and has fixed thereto a threaded screw 34 the shank thereof being received by a tapped central hole provided in the suction cup 28 to mount same to the tubular member 24.

A collar 36 is provided with a central hole 38 as can best be seen in FIG. 4 dimensioned to receive the tubular member 24 and is maintained in a desired axial position along the tubular member 24 by tightening a thumbscrew 40 carried by the collar 36 and adapted upon tightening to engage the exterior surface of the tubular member 24 and thereby lock the collar 36 in position. The collar 36 is provided with four equally annularly spaced and substantially radially extending holes 42 each of which receives the ends of the arms 22. As can best be seen in FIG. 4 the holes 42 are preferably formed with their axes inclined upwardly slightly from the horizontal so that the arms 22 extend in a similar direction.

As can best be seen in FIGS. 3 and 5 each of the arms 22 comprises an inner preferably tubular member 44 and an outer tubular member 46 joined together by a sleeve 48 which encompasses the adjacent ends of the members 44 and 46. The sleeves 48 are each provided with a nut 50 secured thereto to provide a threaded opening to receive a thumbscrew 52 which can be tightened through a hole 54 to lock the sleeve 48 to the end of the inner member 44. The sleeve 48 is fixed to the outer tubular member 46 by any convenient means such as by staking.

An end plug 56 is mounted within the free end of each of the outer tubular members 46 by any convenient means and each end plug 56 is provided with a reduced end portion 58 extending beyond the end of the tubular member 46.

As can best be seen in FIGS. 3 and 6 a clamp member 60 is carried on the outer tubular member 46 of a pair of adjacent arms 22. The clamp members 60 each preferably comprise a U-shaped portion 62 which encompasses the member 46 and adjacent flat portions 64 and 66 which when brought toward one another compress the portion 62 to tightly secure the clamp member to the member 46. The flat portions 64 and 66 carry a screw 68 and a suction cup 70 is mounted to the clamp member 60 and then to the arm 22 by the screw 68.

A tie down assembly is provided for the shelter of the present invention and preferably comprises an elongated preferably webbed cloth member 72 mounted to each of the arms 22. As can best be seen in FIG. 5 each of the members 72 is preferably provided with a reinforced hole 74 near one end which is adapted to be received over the end portion 58 of the plug 56 carried by the outer tubular members 46 intermediate the end of the member 46 and the flap 14. The opposite end of the members 72 as can best be seen in FIG. 7 is threaded through a clip 76 and through a conventional locking buckle 78 mounted at a point spaced from the end of the member 72 so that the length of the member 72 can be shortened or lengthened by adjusting the end of the member 72 in the buckle 78 and locking the end in the buckle 78 at the desired length. As also can best be seen in FIG. 7 a portion of the member 72 is brought together in an area above the buckle 78 to form a loop and a piece of elastic material 80 is secured to the member 72 preferably by sewing at each end of the material 80 to close the loop.

The tie down assembly further comprises elongated preferably webbed cloth members 82 one being mounted to each of the arms 22 as by the rings 84 carried by the outer tubular members 46 as shown in FIG. 5 and having the opposite end secured to the members 72 as by sewing above the elastic material 80 as can best be seen in FIG. 7.

The shelter of the present invention is mounted to the automobile 10 by first positioning the center post assembly 20 near one side and substantially midway between the front and the back of the roof of the automobile as can best be seen in FIGS. 1 and 2. The center post assembly 20 is secured in this position by attaching the suction cup 28 to the roof. The top member 12 is then positioned over the automobile 10 with the hole provided by the grommet 16 being brought into alignment and over the reduced end portion 30 to the position shown in FIG. 4. With the thumbscrew 52 loosened to permit the arms 22 to be shortened as much as possible the ends of the inner members 44 are positioned within the holes 42 provided in the collar 36 so that the arms 22 extend radially from the collar 36 as shown in FIG. 3 with those arms carrying the suction cups 70 over the roof of the automobile and away from the side of the roof to which the suction cup 28 is mounted. The top member 12 is then manipulated to bring the holes provided by the grommets 18 into axial alignment with the arms 22. Then with the ends of the tie down members 72 positioned over the reduced end portions 58 one by one the arms 22 are extended by moving the sleeve 48 outwardly on the inner member 44 until the reduced end portions 58 of the end plugs 56 extend through the grommets 18. The arms 22 are locked in the extended position by the thumbscrews 52. At this point it may be necessary to loose the thumbscrew 40 carried by the collar 36 to permit rotational and axial adjustment of the collar 36 for properly positioning the top member 12 with respect to the automobile 10 and for more securely locking the arms 22 within the grommets 18.

With the top member 12 and the arms 22 in the proper position the suction cups 70 are secured to the roof of the automobile and the tie down members 72 are pulled downwardly to permit the clips 76 to be hooked under the fender or the like of the automobile. The tautness of the members 72 can be adjusted by the buckles 78 and the elastic material 80 will provide sufficient tautness and resiliency to retain the clips 76 in position while still permitting a certain amount of flexibility in the support system necessary to withstand damages which may be caused by wind. The member 82 acts to urge the lower portion of the member 72 in a substantially vertical direction so as to reduce the tendency of the clip members 76 to be pulled from their connected position.

The top member 12 is dimensioned and positioned to project outwardly from the roof of the automobile to provide ample shaded or protected area beneath the top member 12. The center post assembly 20 and the suction cups 70 position the top member 12 above the roof of the automobile and provide an air space therebetween which tends to keep the automobile cool.

It is apparent that a shelter has been disclosed which can be readily assembled and disassembled and which can be rolled up into a compact package for storage. The support system produces no interference with the doors of the automobile so that they can be opened or closed on either side with the shelter in place.

It is also apparent that although I have described but a single embodiment of my invention many changes and modifications can be made therein without departing from the spirit of the invention as expressed by the appended claim.

I claim:

A shelter attachment adapted to be mounted on a supporting surface, said shelter attachment comprising,
(a) a support post having means for attachment to said supporting surface,
(b) a plurality of arm members extending radially from said support post,
(c) a flexible top member overlying said support post and said arm members and means for detachably securing said top member to said support post and said arm members,
(d) said last mentioned means comprising openings provided in said top member to axially receive the ends of said post and said arm members and means for adjusting the length of said arm members whereby said arm members may be initially adjusted to a shortened length, aligned with said holes and then lengthened to move the ends of said arm members axially into said holes, and
(e) said top member being rectangular and including,
 (1) a collar member slidably carried on said support post and means for locking said collar member to said post at a desired axial position, and
 (2) four equally spaced substantially radially extending holes being provided in said collar member and said arm members being received by said holes and extending diagonally to the corners of said top member.

References Cited

UNITED STATES PATENTS

| | | | |
|---|---|---|---|
| 1,245,944 | 11/1917 | Morgan | 135—2 |
| 2,306,537 | 12/1942 | Hamm | 135—5 |
| 3,044,476 | 7/1962 | Avery | 135—1 |
| 3,156,497 | 11/1964 | Lessard | 135—5 |

FOREIGN PATENTS

| | | |
|---|---|---|
| 594,834 | 7/1925 | France. |
| 691,736 | 5/1953 | Great Britain. |

REINALDO P. MACHADO, *Primary Examiner.*